United States Patent
DiGiorgio et al.

(10) Patent No.: US 6,385,729 B1
(45) Date of Patent: May 7, 2002

(54) SECURE TOKEN DEVICE ACCESS TO SERVICES PROVIDED BY AN INTERNET SERVICE PROVIDER (ISP)

(75) Inventors: Rinaldo DiGiorgio, Stony Brook, NY (US); Michael S. Bender, Boulder Creek, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/085,075

(22) Filed: May 26, 1998

(51) Int. Cl.[7] .............................................. G06F 12/14
(52) U.S. Cl. ....................... 713/201; 713/172
(58) Field of Search ................... 713/172, 159, 713/170, 171, 173, 201; 705/50, 17, 51, 26, 52, 27, 53, 40, 43, 44, 45; 340/825.31, 825.34; 348/7

(56) References Cited

U.S. PATENT DOCUMENTS

| 5,586,166 A | 12/1996 | Turban | 379/58 |
| 5,665,951 A | 9/1997 | Newman | 235/375 |
| 6,038,367 A | * 3/2000 | Abecassis | 386/46 |

FOREIGN PATENT DOCUMENTS

| EP | 644 513 | 3/1995 |
| EP | 0833285 A2 | * 9/1997 |
| EP | 833 285 | 4/1998 |
| WO | WO 93/06546 | * 11/1991 |
| WO | WO 97/14118 | 4/1997 |
| WO | WO 98/06054 | 2/1998 |

OTHER PUBLICATIONS

Java card Internet, Scott, Guthery, 2 pages, Feb. 1997.*
Dallas Semicondutor Java Links iButton, 1 page, Aug. 1997.*
"Java links ibutton to the internet," Dallas semiconductor press releases, Online! (1997) pp 1–3, XP002130009, <URL:http://www.dalsemi.com/News_Center/Pr.
Guthery, "Java card: Internet computing on a smart card," *IEEE Internet computing*, pp. 57–59 (1997).

* cited by examiner

*Primary Examiner*—James P. Trammell
*Assistant Examiner*—Pierre E Elisca
(74) *Attorney, Agent, or Firm*—Lahive & Cockfield, LLP

(57) ABSTRACT

A secure token device, such as a smart card or an ibutton, provides a user with a vehicle for accessing services that are provided by an Internet Service Provider (ISP). The user places the secure token device in communication with a reader that is coupled to a computer system. The computer system includes a web browser for accessing the services provided by the ISP. The secure token device may perform an authentication protocol to authenticate itself to the ISP. The ISP may also be required to authenticate itself. The secure token device may hold an electronic currency token for payment of services rendered by the ISP. The secure token device may contain stored personal information about the user. The user may stipulate what portions of this personal information are provided to the ISP upon request. Contextual information regarding sessions with the ISP may also be stored on the secure token device and used to restore a context of a previous session during a subsequent session.

34 Claims, 10 Drawing Sheets

SECURE TOKEN DEVICE ACCESS TO SERVICES PROVIDED BY AN INTERNET SERVICE PROVIDER (ISP)

TECHNICAL FIELD OF THE INVENTION

The present invention relates generally to data processing systems and more particularly to secure token device access to services provided by an Internet Service Provider (ISP).

BACKGROUND OF THE INVENTION

An ISP is a vendor who provides customers with access to the Internet. Examples of ISPs include America Online (AOL), CompuServe and the Microsoft Network (MSN). In addition to providing access to the Internet, ISPs may also provide additional services to their customers, including chat rooms, news services, electronic mail messaging and bulletin board services.

ISPs provide access to the Internet to customers by employing one or more Internet servers. These servers are directly connected to the Internet and act as conduits for customers to access web pages resident on other servers on the Internet. Typically, a customer uses a conventional modem to place a call to a designated ISP server. The modem need not be a conventional modem but may be instead, a cable modem or a wireless modem. The ISP server answers the call and a connection is established between the server and the customer's computer. After this connection is established, the customer is prompted to login. In particular, the customer is prompted usually to enter a user ID and a password. The information entered by the customer is compared to data stored in a database with the ISP to determine whether the user is who the user purports to be. If the customer provides the proper information and has sufficient privileges, the customer is granted access to the Internet.

There are a number of drawbacks associated with the above-described conventional approach to providing Internet access to customers. First, the Internet Protocol (IP) is used for messaging addressing on the Internet and the protocol is a connectionless protocol. As such, the protocol does not support the persistent storage of contextual information. Thus, any contextual information associated with one customer session on the Internet is not carried forward to the next customer session. Each session must start anew in creating a context. Second, the conventional approach to providing access to the Internet by ISPs is susceptible to fraud. If a party can obtain a user ID and password for a user, the party can gain access to the Internet via the user's account. Third, most ISPs currently provide only one variety of service such that all customers are offered this single variety of service. For example, all customers may be offered full access to a complete range of services provided by an ISP and all customers may be charged a flat fee for a designated time frame of service (e.g. for a month of service or a year of service). Customers who use the services more frequently than other customers are not charged additional amounts. Hence, there is a lack of flexibility in the pricing and service options available to customers from ISPs in conventional systems.

SUMMARY OF THE INVENTION

The present invention addresses the limitations of the prior art by providing users with secure token device access to services offered by ISPs. "Secure-token devices" are devices such as smart cards and ibuttons that hold currency tokens and other information in a secure fashion. Preferably, the secure token device is of a size, shape and weight that it is easily carried by a user. The secure token device may even be wearable by a user. When a user wishes to access services provided by an ISP, the user puts a secure token device in communication with a reader. The reader is a device that is configured to read and communicate with the secure token device. The reader is coupled to a computer system, such as a personal digital assistant (PDA), workstation or a personal computer (PC). When the user places the secure token device in or against the reader (depending on the type of reader), the reader recognizes the insertion of the secure token device and prompts the computer system to begin communicating with the secure token device. The computer system may seek to verify that the user is the proper owner of the secure token device. To that end, the computer system may request that the user enter a personal identification number (PIN). The user enters a PIN and the PIN is compared with a PIN value that is stored on the secure token device. If the PIN value entered by the user matches the PIN value on the secure token device, the computer system verifies that the user is the owner of the secure token device and the process of accessing the ISP services may be initiated.

The secure token device may hold identification information that is globally unique across geographic and political boundaries. This identification information is held securely on the secure token device. It is difficult for a party to physically access the identification information. The secure token device serves as a physical token of authenticity for the party. In order to fraudulently use the secure token device, a party must both physically take the secure token device and also be aware of the PIN associated with the user of the secure token device. Hence, the use of the secure token device helps to decrease the probability of fraud.

Contextual information (i.e., a context) may be stored on the secure token device of the user. The context may, for example, identify user preferences and configuration information. When a user seeks to access the services of the ISP, the context from a previous session may be restored by retrieving the context from the secure token device. This ability to preserve context enhances the services provided to the user and eliminates the need for the user to recreate a context each time the user accesses ISP services.

The secure token device may also support various electronic banking or electronic commerce mechanisms that facilitate the exchange of electronic currency. The secure token device may be used in realizing payment for services provided by ISPs. The user may download currency tokens from the secure token device to the ISP to cover expenses associated with the services provided during a given session. This ability to receive payment for services during a session with the user enhances the ability of ISPs to tailor pricing schemes on a per use basis. An ISP may charge a user for the services rendered during a given session as opposed to using a flat rate scheme over an extended time period, such as a month or a year. Thus, users are charged on the basis of the resources they consume rather than on a flat rate basis.

The secure token device of a user may contain personal information regarding a user, such as name, address, and credit card account information. The user has the ability to customize what portions of this personal information may be accessed by a service provider. Hence, the user may determine that an ISP should only be given access to the user's name and address and should not given access to the user's credit card account information. For another service provider, the user may grant the service provider full access to all of the personal information. This approach has the added benefit of storing personal information more securely than instances where the personal information is stored on database maintained by an ISP. It should be noted, however, that ISPs may store additional information on secure token devices that is not readily accessible to users. A further benefit of this approach is that it gives the user control over what personal information the user grants to respective parties. Still, further, the storage of personal information on the secure token device facilitates companies to develop loyalty marketing programs, such as frequent flier programs. The frequent flier miles of a user may be stored on the secure token device, added to the storage on the secure token device and redeemed from the secure token device.

BRIEF DESCRIPTION OF THE DRAWINGS

An illustrative embodiment consistent with the principles of the present invention will be described below relative to the following drawings.

DETAILED DESCRIPTION OF THE INVENTION

In the illustrative embodiment consistent with the present invention, a user gains access to services provided by an ISP by employing a secure token device, such as a smart card or an ibutton (such as produced by Dallas Semiconductor Corporation). The secure token device is a secure electronic device that holds globally unique identification information regarding the user. The user may be required to enter a password or PIN to verify that the user is the same party whose identification information is stored on the secure token device. The secure token device is programmed to support two-way verification between the user and the ISP. Specifically, the user must prove that the user is who the user purports to be, and the ISP must prove that the service is what it purports to be.

The secure token device may hold contextual information on behalf of the user. The contextual information may capture the context of a previous session with the ISP. When the user again gains access to the services of the ISP, the context from the previous session may be restored. For example, user preferences and other contextual information that were entered in a previous session may be carried forward into the new session.

The secure token device may run multiple programs. The programs may include code for facilitating access to the services of an ISP and code for electronic commerce transactions. These transactions may entail the exchange of electronic currency in the form of tokens. Thus, when the user accesses a web site or other service that requires payment for the tendering of goods or services, the user can pay for the goods or services using the tokens contained services based on the secure token devices. It should be appreciated that the ISPs may serve the role of distributor for distributing the secure token devices to customer.

The secure token device may hold information regarding the user that is potentially sensitive. The user has control over dissemination of this information. The user selects what portions of this information are available to respective requesters. Different requesters may be granted different permissions. For example, a first requester may receive a first set of personal information and a second requester may receive a second set of personal information that differs from the first set.

The use of the secure token device enables ISPs to tailor their service offerings and billing options to individual users. The users may be offered different service options. For example, a first user may be offered a service option where the user is only permitted to browse the Internet. A second user, in contrast, is offered the ability to browse the Internet and to send emails, visit chat rooms and visit news sites. The second user may be charged additional amounts for the expanded service. Other types of expanded service may include secure email and authenticated connections with other users.

Figure 1:
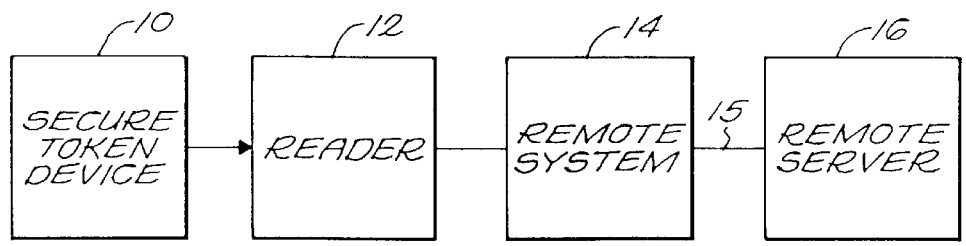
FIG. 1 is a block diagram that illustrates hardware components used to practice the illustrative embodiment of the present invention.

FIG. 1 is a block diagram that illustrates several of the hardware components employed in the illustrative embodiment consistent with the present invention. These components include a secure token device 10 that is provided for a user. The secure token device 10 may be any secure device that is capable of holding electronic currency tokens, identification information and context information. Preferably, the secure token device is of an appropriate size, weight and shape to be portable and easily carried by a user. Suitable secure token devices include smart cards and ibuttons. A secure token device is an integrated circuit card that preferably is sized to fit into a user's wallet or purse. Ideally, a smart card is the size of a credit card. The smart card has computer components such as a microprocessor and a storage embedded in it. A smart card that may be used to practice the present invention may comply with the ISO-7816 standard or the EMV integrated circuit card specification. For purposes of the discussion below, it is assumed that if a smart card is used as the secure token device, the smart card complies with the JavaCard 2.1 specification as defined by Sun Microsystems, Inc. The JavaCard 2.1 specification requires that the secure token device be capable of running programs written in the Java™ programming language. Java is a trademark of Sun Microsystems, Inc. Those skilled in the art will appreciate that the programs used to practice the present invention may be written in programming language other than Java™, including C, C++ and Basic.

An ibutton is a computer chip that is housed in a cylindrical housing (such as a steel canister). The housing is designed to withstand the harsh conditions of outdoor environments. The ibutton may be incorporated into a ring or other wearable item. For instance, ibuttons may be affixed to badges, watches, rings key chains and the like. The chip within the housing includes a microprocessor and may also contain computer memory, a clock or sensors. Such ibuttons are used by contacting the ibuttons with readers (e.g. "blue dot receptors") that are cabled into the serial ports of associated computers. A suitable ibutton for practicing the illustrative embodiment consistent with the present invention is the Java™ Ring produced by Dallas Semiconductor Corporation.

The hardware components used in the illustrative embodiment consistent with the present invention also include a reader 12. The reader 12 is a device for facilitating communications between a computer system 14 and the secure token device 10. The reader 12 provides a path for application programs run on computer system 14 to communicate with the secure token device 10. Preferably, when the secure token device is a smart card, the reader 12 is compliant with the OpenCard standard. The OpenCard standard is a standard that provides for inter-operability of secure token device applications across devices, such as network computers, laptop computers, desktop boxes, desktop computers, cellular phones and personal digital assistants (PDAs). A number of different commercially available card terminals may be utilized as the reader 12 when the secure token device is a smart card. A suitable reader is the IBM 594A card terminal. When the secure token device 10 is an ibutton, a suitable reader is the DS1402 blue dot receptor from Dallas Semiconductor Corporation. The reader may also be a proximity detector.

The computer system 14 may be a PDA, a personal computer (PC) or a workstation. The configuration of the computer system 14 will be described in more detail below. The computer system 14 may communicate with a remote server computer system 16 via a communications link 15. The communications link 15 may be, for example, a telephone line connection. More generally, the communication link 15 may be a wireless connection, a cable modem connection, a satellite connection or a direct connection. The remote server 16 is controlled by the ISP and provides the user with access to the Internet.

Figure 2A:
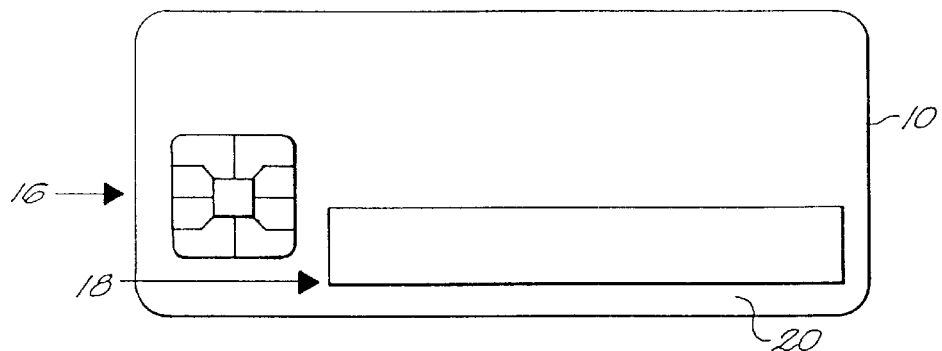
FIGS. 2A and 2B illustrate the exemplary layout for a smart card to be used in the illustrative embodiment of the present invention.
Figure 2B:
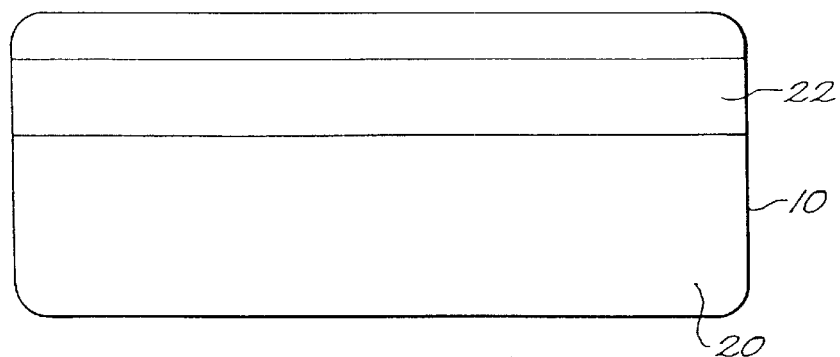
Figure 2C:
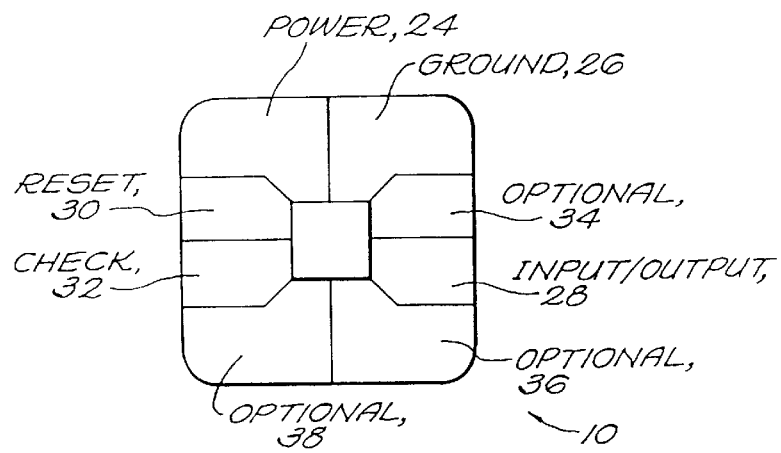
FIG. 2C illustrates the contacts on the smart card of FIG. 2A in more detail.

FIGS. 2A and 2B illustrate an exemplary physical layout for a smart card to be used as the secure token device 10. The secure token device 10 is formed on a plastic substrate 20. The front of the card (as shown in FIG. 2A) includes a number of electrical contacts 16 which facilitate communications with the smart card. FIG. 2C shows these contacts 16 in more detail. Contact 24 is used to connect with the power source that is provided by the smart card reader. Contact 26 is to be coupled to a ground connection on the smart card reader. Contact 28 is used for input/output of data packets (described below). Contact 30 is used to reset the smart card, and contact 32 is used for a check procedure performed on the smart card to ensure that the smart card is operating properly. Optional contacts 34, 36 and 38 are also provided. The front of the smart card may also include an embossing area 18 where the user may sign the smart card. The back of the smart card (as shown in FIG. 2B) may include a magnetic strip 22 for holding information that is magnetically encoded. In some applications, the smart card may be used as an ID badge that permits a user access to certain locales. The magnetic strip may hold information that permits the user to gain access to a secure area or other locales, for example.

Those skilled in the art will appreciate that the physical layout of the smart card shown in FIGS. 2A–2C is intended to be merely illustrative and not limiting of the present invention. The secure token device used to practice the present invention may have a different physical configuration with additional components or fewer components than shown in FIGS. 2A–2C.

Figure 3:
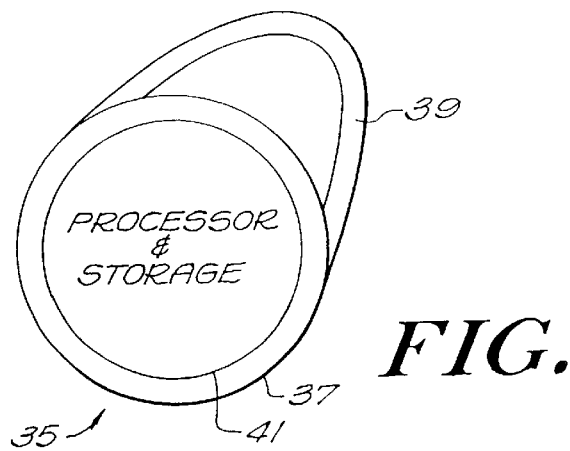
FIG. 3 illustrates an example of an ibutton ring to be used in the illustrative embodiment of the present invention.

FIG. 3 depicts an example of the physical layout of a Java Ring 35 that is suitable for practicing the present invention. The Java™ Ring 35 includes a steel cylindrical housing 37 that houses an integrated circuit (IC) 41 that contains a microprocessor and a storage (i.e. a computer memory). The Java™ Ring 35 also includes a ring portion 39 that enable a user to wear the whole device like an ordinary ring. As will be described in more detail below, the processor and storage work in conjunction to runs programs that help facilitate the illustrative embodiment of the present invention.

Figure 4:
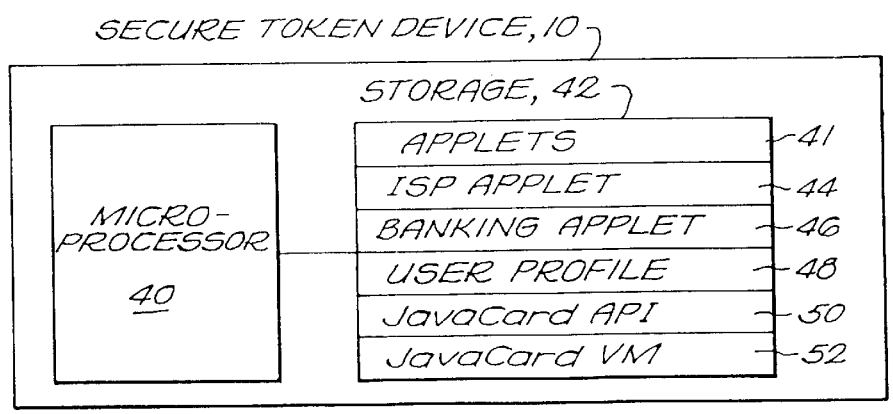
FIG. 4 is a block diagram illustrating computing components on the secure token device.

FIG. 4 shows a block diagram of the computer architecture of the secure token device 10. The computer architecture includes a microprocessor 40 and a storage 42. The storage 42 may be formed by different types of devices, including random access memory (RAM), read only memory (ROM), and electrically erasable programmable read only memory (EEPROM) devices. Those skilled in the art will appreciate that the storage 42 may also include other types of storage devices. The storage 42 holds a number of types of data and programs that may execute on the microprocessor 40. In the illustrative embodiment of the present invention, it is assumed that the processor 40 on the secure token device 10 is capable of running programs written in the Java™ programming language. An "applet" is a special type of program that runs inside an applet viewer, a web browser or a secure token device. The storage 42 holds a copy of an ISP applet 44. The ISP applet 44 enables the secure token device 10 to communicate with an ISP and to receive services from an ISP. Those skilled in the art will appreciate that the secure token device may instead run programs in programming languages other than Java™.

The storage 42 also holds a copy of a banking applet 46 that allows the secure token device 10 to be utilized in electronic commerce transactions. As will be described in more detail below, in the illustrative embodiment, the banking applet 46 allows the secure token device to be used with a MONDEX system or other type of electronic commerce system. The secure token device 10 may hold tokens representing units of electronic currency that may be used to pay for goods and services. The banking applet provides the intelligence for participating in such transactions. The storage 42 may also hold other applets 41.

The storage 42 holds a copy of a user profile 48. The user profile contains personal information regarding a user. Preferably, as will be described in more detail below, the user profile 48 complies with the Open Profiling Standard (OPS) and/or the Information & Content Exchange (ICE) protocol.

The storage 42 additionally holds the JavaCard API as defined in the JavaCard 2.1 specification. In instances where the secure token device is not a smart card, other similar API sets may be alternatively used. The JavaCard API is an application program interface that provides a broad range of functionality for the secure token device 10. The major components of the JavaCard API 50 will be described in more detail below. The applets stored on the secure token device 10 may instantiate object classes defined in the API to realize desired functionality. The storage 42 holds a copy of a JavaCard virtual machine (VM) 52. The JavaCard virtual machine is like a conventional Java virtual machine but is streamlined to operate with the memory and processing restrictions that are found with secure token device 10. The JavaCard VM provides platform independence for the Java programs that are run on the processor 40.

Those skilled in the art will appreciate that the secure token device 10 may hold additional programs and data that differ from that shown in FIG. 4.

Figure 5:
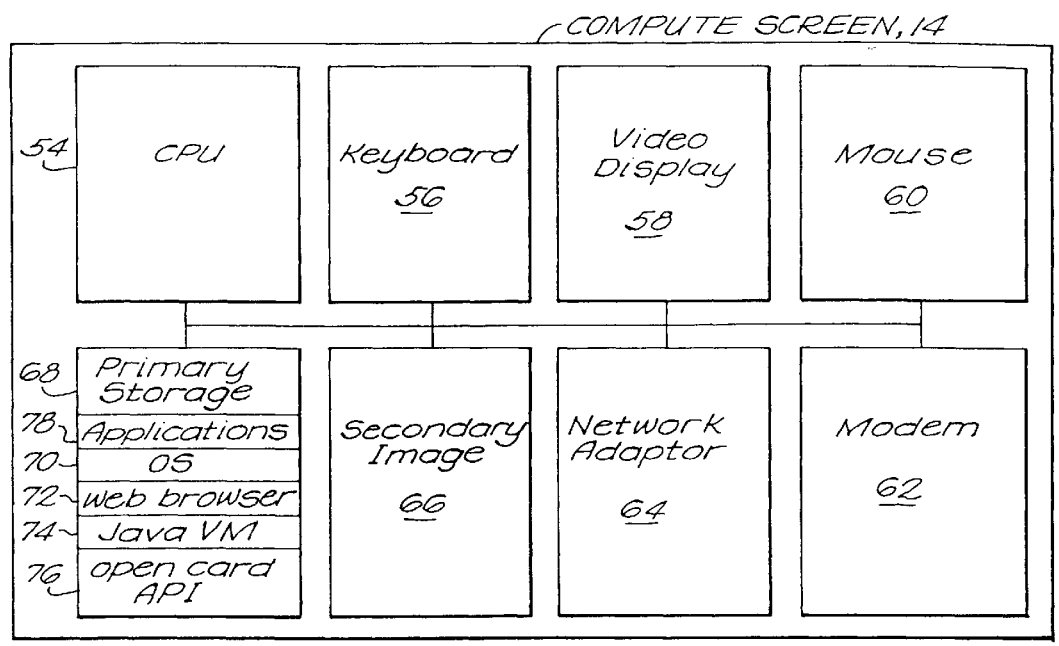
FIG. 5 is a block diagram illustrating components of the computer system of FIG. 1 in more detail.

FIG. 5 is a block diagram that shows the components of the computer system 14 in more detail. Computer system 14 includes a central processor unit (CPU) 54 for executing instructions. A number of peripheral devices, including a keyboard 56, a video display 58, and a mouse 60, may be provided as part of the computer system 14. A modem 62 may be provided to allow the computer system to communicate over analog telephone lines, and a network adapter 64 may be provided to facilitate the connection of the computer system 14 to a local area network (LAN). As has been discussed above, the computer system 14 may also include other components, such as a cable modem, for facilitating remote communications with the remote server 16.

The computer system 14 includes both primary storage 68 and secondary storage 66. The secondary storage 66 may include a number of types of persistent storage. For example, the secondary storage 66 may include CD-ROM drives, hard disk drives and other types of computer-readable mediums. The primary storage 68, likewise, may include a number of different types of storage, including DRAM, SRAM, and the like. The primary storage 68 holds a copy of an operating system 70. The Solaris® operating system is suitable for practicing the illustrative embodiment of the present invention. "Solaris" is a registered trademark of Sun Microsystems, Inc. A web browser 72 is provided in primary storage 68 to facilitate access to the Internet. Suitable web browsers include Netscape Navigator, Netscape Communicator and Microsoft Internet Explorer. It should be appreciated the web browser 72 may include intelligence for processing hypertext mark-up language (HTML) documents. A Java™ VM 74 is provided in primary storage 68 for interpreting Java programs. The OpenCard API 76 is also found within the primary storage 68. Additional applications 78, including Java applets, may also be stored in the primary storage 68. These applications may instantiate objects of the object classes defined in the OpenCard API to realize needed functionality.

Those skilled in the art will appreciate that various ones of the components depicted in FIG. 5 as being stored in the primary storage 68 may alternatively be stored in the secondary storage 66. Those skilled in the art will also appreciate that the computer system 14 shown in FIG. 5 is intended to be merely illustrative and not limiting of the present invention. Further, it should be appreciated that the reader 12 shown in FIG. 1 may be integrated as part of the computer system 14.

Figure 6:
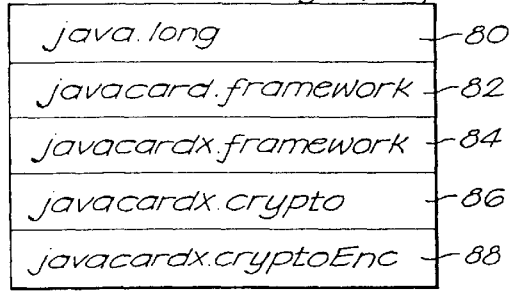
FIG. 6 illustrates the various Java packages that are found on the secure token device.

The Java™ programming language is object-oriented. It generally supports the arrangement of sets of object classes into packages. The JavaCard API 50 is divided into a number of packages 78, as shown in FIG. 6. The java.lang package 80 contains a number of object classes that are concerned with exceptions, such as run time exceptions and security exceptions. The javacard.framework package 82 contains object classes for APDUs (defined below), applets, PINs and various system constants. The javacardx.framework package 84 contains object classes relating to file system structures. The jacacardx.crypto package 86 holds objects that provide cryptography support on the secure token device 10. The javacardx.cryptoEnc package 88 contains object classes relating to the DES encryption scheme. These packages are described in more detail in *JavaCard* 2.1 *Application Programming Interfaces,* specification from Sun Microsystems, Inc., which is explicitly incorporated by reference herein.

Figure 7A:
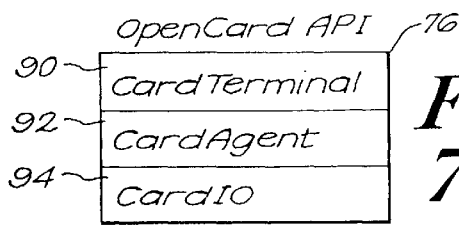
FIG. 7A illustrates object classes that are supported by the computer system of FIG. 1.
Figure 7B:
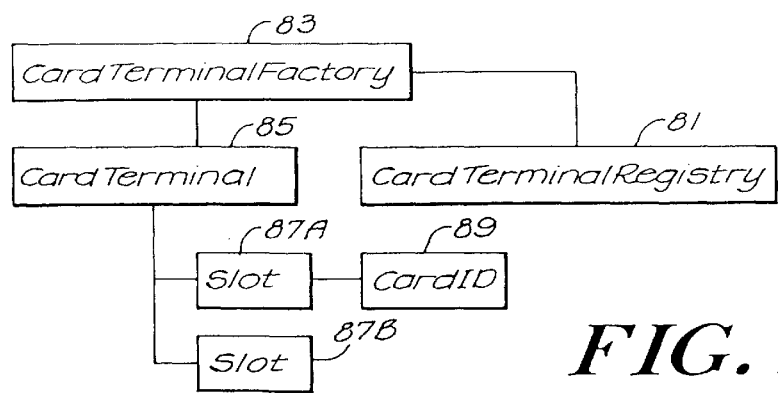
FIG. 7B illustrates object-classes that are part of the CardTerminal component.

Programmatic support for use of the secure token device 10 is provided on the computer system 14. The OpenCard API 76 provides a number of interfaces that facilitate communications with the secure token device. FIG. 7A depicts the major components of the OpenCard API 76. The CardTerminal component 90 abstracts the readers (also known as card terminals) that help to interface the secure token device 10 with the computer system 14. Each reader (see FIG. 7B) is represented by an instance of the CardTerminal object class 85. A CardTerminal Factory 83 object class is defined to instantiate instances of the CardTerminal object class. The CardTerminalRegistry object class 81 (FIG. 7B) is defined as part of the CardTerminal component 90. Only a single instance of this object class exists and this instance serves as the system-wide registry. Register() and unregister() methods are provided for this object class to dynamically add or remove card terminals from the registry. A slot object class is defined for each slot in a reader. Each instance 87A and 87B of this object class represents a physical card slot in a card terminal. A CardID object class 89 is defined in the CardTerminal component 90 to represent a secure token device.

Figure 7C:
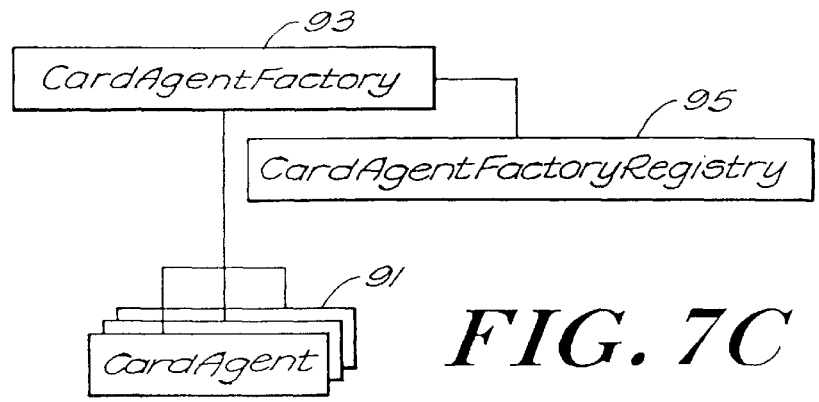
FIG. 7C illustrates object-classes that are part of the CardAgent component.

The CardAgent component 92 abstracts an agent that operates on behalf of the secure token device 10. A CardAgent object class 91 (See FIG. 7C) is defined in this package to abstract the functionality of the secure token device. Each agent has a separate instance of the object class. Communications between the secure token device 10 and the computer system 14 pass through the CardAgent. A CardAgent Factory object class 93 support instantiation of CardAgent objects 91 and a CardAgent Factory Registry object class 95 may be instantiated to hold a registry of all agents.

Figure 7D:
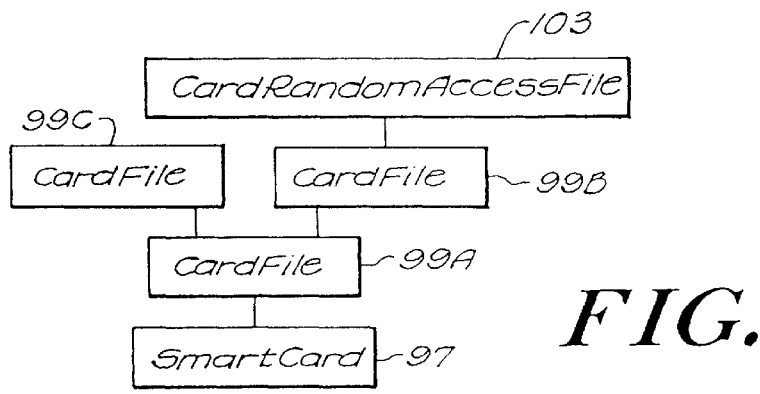
FIG. 7D illustrates object-classes that are part of the CardIO component.

The CardIO component 94 contains object classes that are used to support input/output relative to the secure token device 10. All application interaction with the secure token device 10 takes place through objects of the object classes defined in this component 94. A SmartCard object class 97 (See FIG. 7D) is defined to represent a physical secure token device. Access to the file system on the secure token device 10 is achieved by mounting a root master file, resulting in an instance of the CardFile object class 99A, which is defined as part of the CardIO component 94. An application can access other files on the secure token device 10 by instantiating appropriate CardFile objects 99B and 99C. FIG. 7D show an example where three card file objects are instantiated. The CardRandomAccessFile object class 103 defines objects that allow programs to access contents of the associated files.

The OpenCard Framework and API are described in more detail in "Secure token devices and the OpenCard Framework, "*JavaWorld,* January 1998, which is explicitly incorporated by reference herein.

The secure token device 10 and the computer system 14 communicate by passing data packages back and forth. These data packages are known as application protocol data units (APDUs). The format for APDUs is defined in the ISO-7816 standard. Each APDU contains either a command or a response to a command. A master-slave model may be followed where the secure token device 10 plays the slave role and the computer system 14 plays the master role. The secure token device 10 always waits for a command APDU from the computer system 14 by way of the reader 12. The secure token device 10 then executes the command specified in the command APDU and replies to the terminal with a response APDU. A client/server model may also be followed wherein the computer system 14 serves as a security server and the secure token device 10 serves as a client.

Figure 8A:
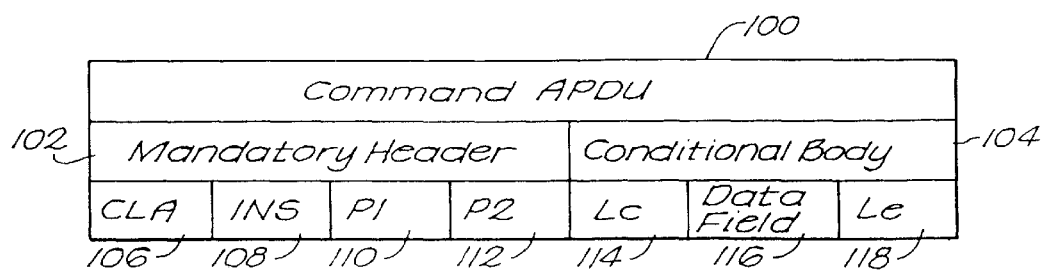
FIG. 8A illustrates the logical format of a command APDU.

FIG. 8A depicts the logical format of a command APDU 100. The mandatory header 102 encodes the command that is to be encapsulated in the APDU. The header 102 includes four fields: the CLA field 106, the INS field 108, the P1 field 110, and the P2 field 112. The CLA field 106 is a class byte that identifies an object class, such as an application program. The INS field 108 is an instruction byte that identifies the instruction (i.e. the command). The P1 field 110 and the P2 field 112 are parameter bytes that provide further qualification of the APDU command. These fields 110 and 112 are used to pass parameters with the command.

The command APDU 100 also contains a conditional body 104. The conditional body 104 contains three fields: the Lc field 114, the data field 116, and the Le field 118. The Lc field 114 holds a value that identifies the number of bytes in the data field 116. The data field 116 is used to hold data, and the Le field 118 identifies a maximum number of bytes that are expected in the datafield in the response APDU that is to be received after the command APDU 100 is processed.

Figure 8B:
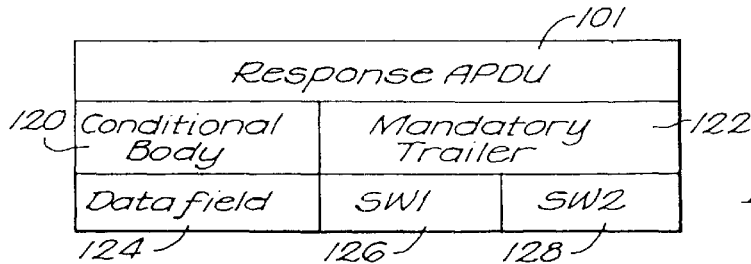
FIG. 8B illustrates the logical format of a response APDU.

FIG. 8B shows logical format of a response APDU 101. The response APDU may contain a conditional body 120 and a mandatory trailer 122. The conditional body 120 includes a data field 124 for holding data. The mandatory trailer 122 contains an SW1 field 126 and an SW2 field 128. These two fields each hold a respective status byte that reflects the status of the command for which the response is sent.

Figure 9:
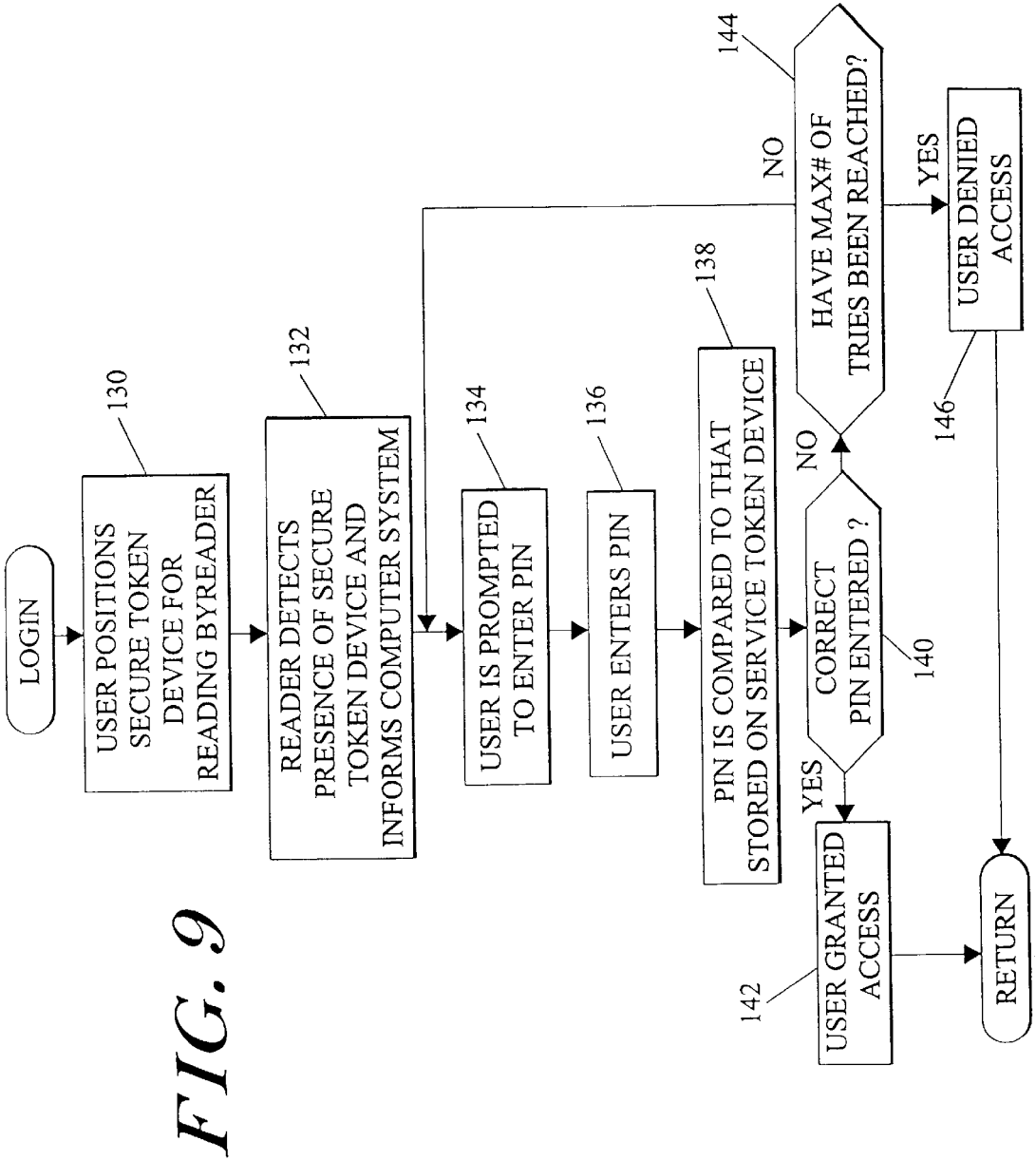
FIG. 9 is a flow chart that illustrates the steps that are performed when a user logs in via a secure token device.

FIG. 9 is a flow chart that illustrates the steps that are performed during initial login when a user using secure token device 10 attempts to gain access to computer system 14. The role played by the secure token device 10 during login may be encoded in one of the applets 41 stored in the storage. Initially, the user places the secure token device 10 in position for reading by reader 12 (step 130 in FIG. 9). The reader 12 detects the presence of the secure token device 10 and then informs the computer system 14 (step 132 in FIG. 9). A number of different login options may be followed but, in general, the computer system 14 begins the login process by sending appropriate command APDUs via the reader 12 to the secure token device 10. The commands prompt the user to enter a PIN value (step 134 in FIG. 9). The PIN may be, for example, a code constituting between 4 to 8 digits that is uniquely assigned to the user. The reader 12 may include a keypad that is used to enter the PIN or, alternatively, the user may enter the PIN via the keyboard 56 that is part of the computer system 14 (step 136 in FIG. 9).

The PIN entered by the user is then compared with the PIN value assigned to the user (step 138 in FIG. 9). In particular, the secure token device 10 holds the proper PIN value for the user within its storage 42 (FIG. 4). The PIN value may be stored as part of the user profile 48. The JavaCard API 50 defines a PIN object class for holding a PIN value, and this object class includes methods for accessing the PIN. These methods are used to obtain the proper PIN and to compare the stored PIN with that entered by the user. The use of the PIN helps to ensure that the proper party and not an unauthorized party is utilizing the secure token device. If the correct PIN has been entered (see step 140 in FIG. 9), the user is granted access to the computer system 14 (step 142 in FIG. 9). If the correct PIN is not entered, the user may be given an additional opportunity to enter the proper PIN. The information stored on the secure token device identifies the maximum number of tries that may be attempted before user is denied access. Hence, in step 144 of FIG. 9, a determination is made whether the maximum number of tries has been reached or not. If the maximum number of tries has been reached, the user is denied access (step 146 in FIG. 9). Otherwise, the process is repeated again, beginning with step 134 in FIG. 9 where the user is prompted to enter a PIN.

Figure 10:
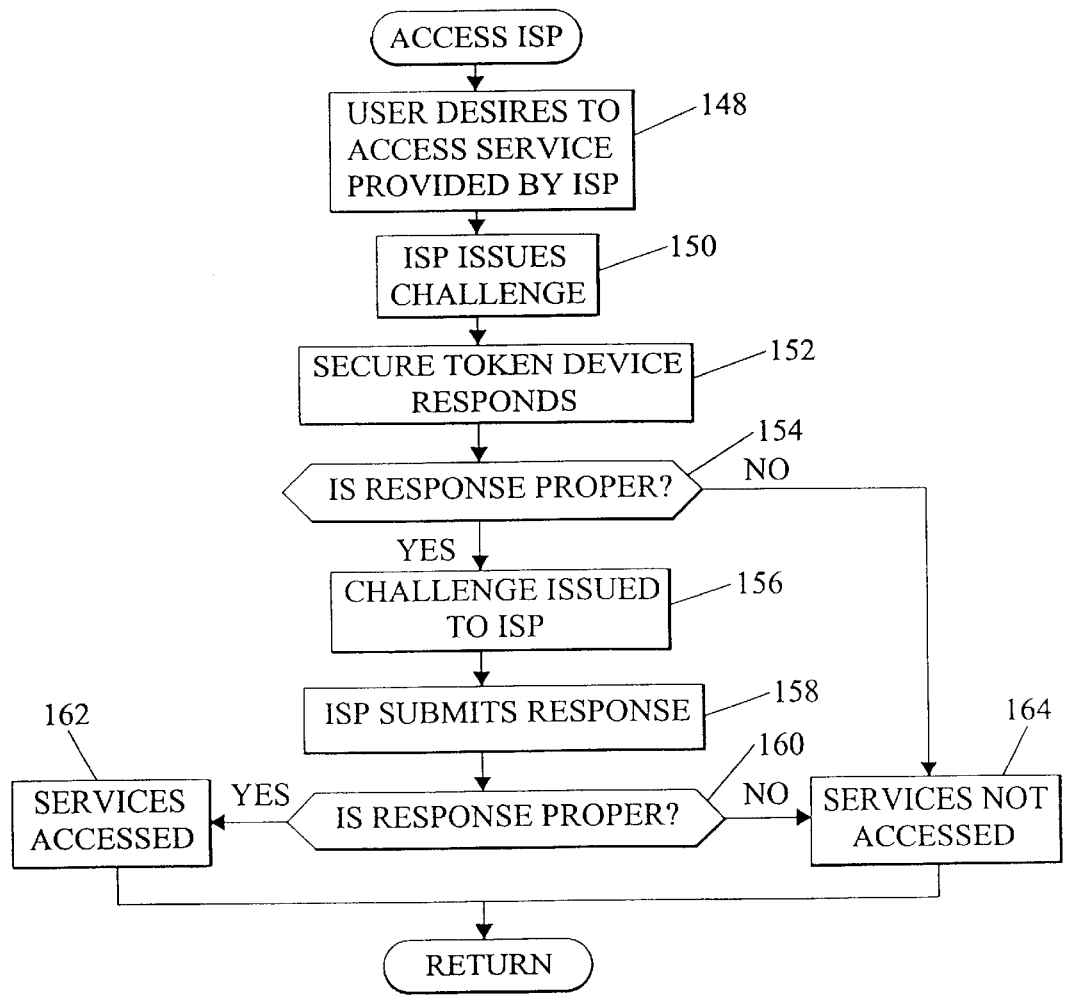
FIG. 10 is a flow chart illustrating the steps that are performed when a user desires to access services provided by an ISP.

After login, the user may desire to access services provided by the ISP (step 148 in FIG. 10). For example, the user may double click on an icon associated with the ISP or the system may automatically attempt to grant the user access to the ISP services once login is completed. A two-way challenge response authentication is then initiated. First, the ISP (i.e. remote server 16) issues a challenge to the secure token device 10 to ensure that the user should be granted access to the ISP services (step 150 in FIG. 10). The secure token device 10 receives the challenge and responds (step 152 in FIG. 10). A proper response reveals knowledge of a shared secret (such as an encryption key). The ISP applet 44 contains the appropriate intelligence for responding to such a challenge. The challenge may be issued by one of the applications 78 stored in the primary storage 68 of the computer system 14. If the response is not proper (step 154 in FIG. 10), the services provided by the ISP are not accessed (step 164 in FIG. 10). If the response, however, is proper, the user is authenticated, and a challenge is issued by the secure token device 10 to the ISP (step 156 in FIG. 10). The ISP responds to the challenge by submitting a response (step 158 in FIG. 10). If the response is proper (see step 160 in FIG. 10), the services provided by the ISP are accessed (step 162 in FIG. 10). In contrast, if the response is not proper, the services are not accessed (step 164 in FIG. 10). Those skilled in the art that multiple two way authentications may be performed.

It should be appreciated that each user has a globally unique ID that is encoded on the secure token device. The user ID is unique across geographic and political boundaries. This user ID may be used in formulating the challenge that is issued by the ISP. Each ISP also has a globally unique ID. The ISP ID may be used in the challenge-response protocol.

Those skilled in the art will appreciate that a number of different challenge/response protocols may be utilized in performing this two-way authentication. For example, SHA-1, XOR and other protocols may be used. Moreover, those skilled in the art will appreciate that the ISP may be first presented with the challenge rather than the secure token device.

Figure 11:
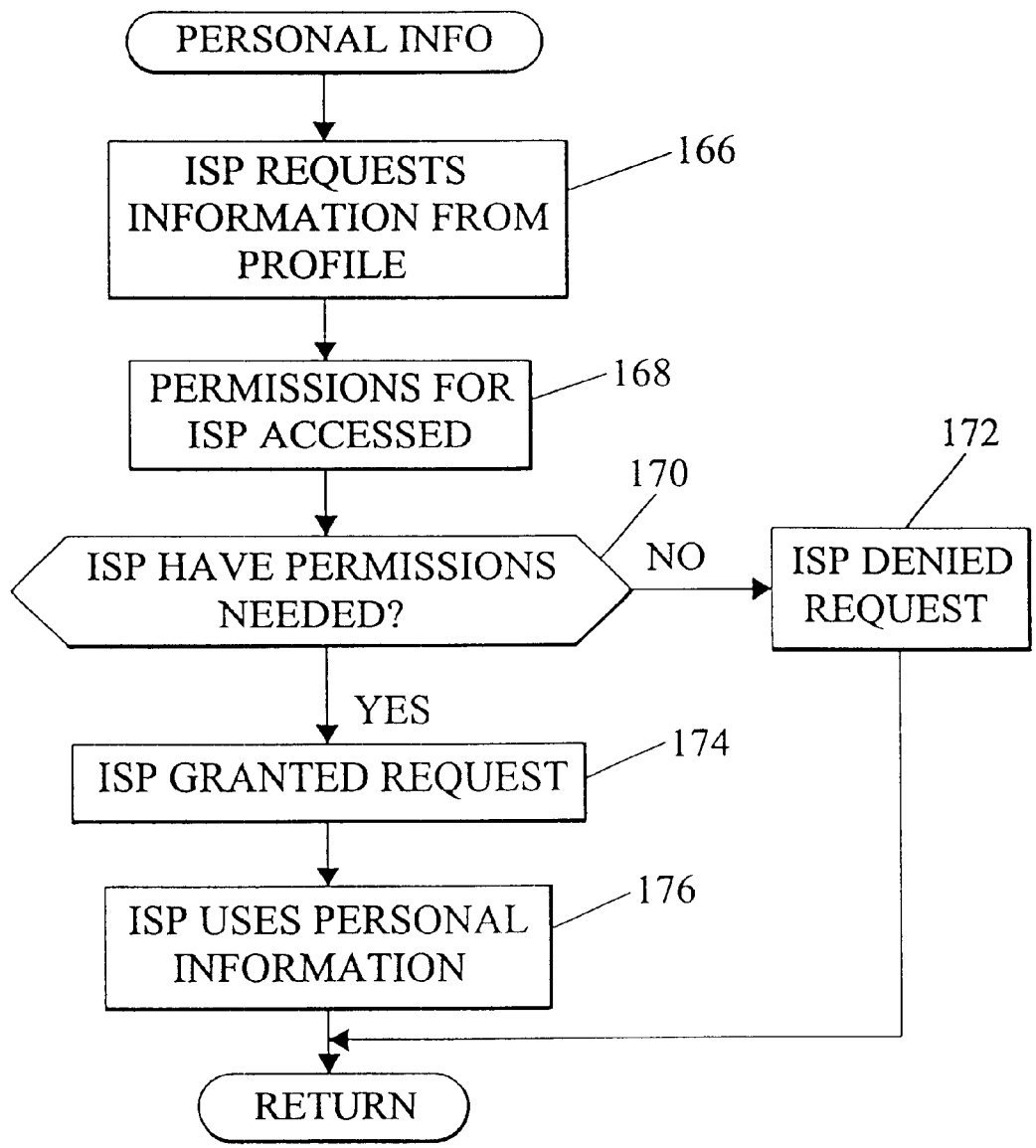
FIG. 11 is a flow chart illustrating the steps that are performed when an ISP seeks context information from a user.

Before the ISP begins providing services or sometime during session where the ISP is providing services, the ISP may seek personal information from the user profile 48 stored on the secure token device 10. The format of the user profile 48 will be described in more detail below. The ISP begins the process by requesting information from the profile 48 (step 166 in FIG. 11). Permissions are defined for each requester that may request personal information of the secure token device 10. These permissions identify what portion or subset of profile data may be accessed by the requester. In response to the request from the ISP, the secure token device 10 accesses the permissions that are provided for the ISP (step 168 in FIG. 11). The request identifies what information is sought from the secure token device. The secure token device determines whether the ISP has the permissions needed to receive the requested information (step 170 in FIGS. 11). If the ISP lacks the appropriate permissions, the ISP is denied access (step 172 in FIG. 11). If the ISP has the appropriate permissions, the ISP is granted access to the information, and the secure token device 10 forwards the information to the ISP (step 174 in FIG. 11). This information may be forwarded from the secure token device 10 to the computer system 14 in encrypted form for security purposes. It should be appreciated that the secure token device may partially grant the request where an ISP requests information that it is permitted to receive as well as information it is not permitted to receive.

Figure 12:
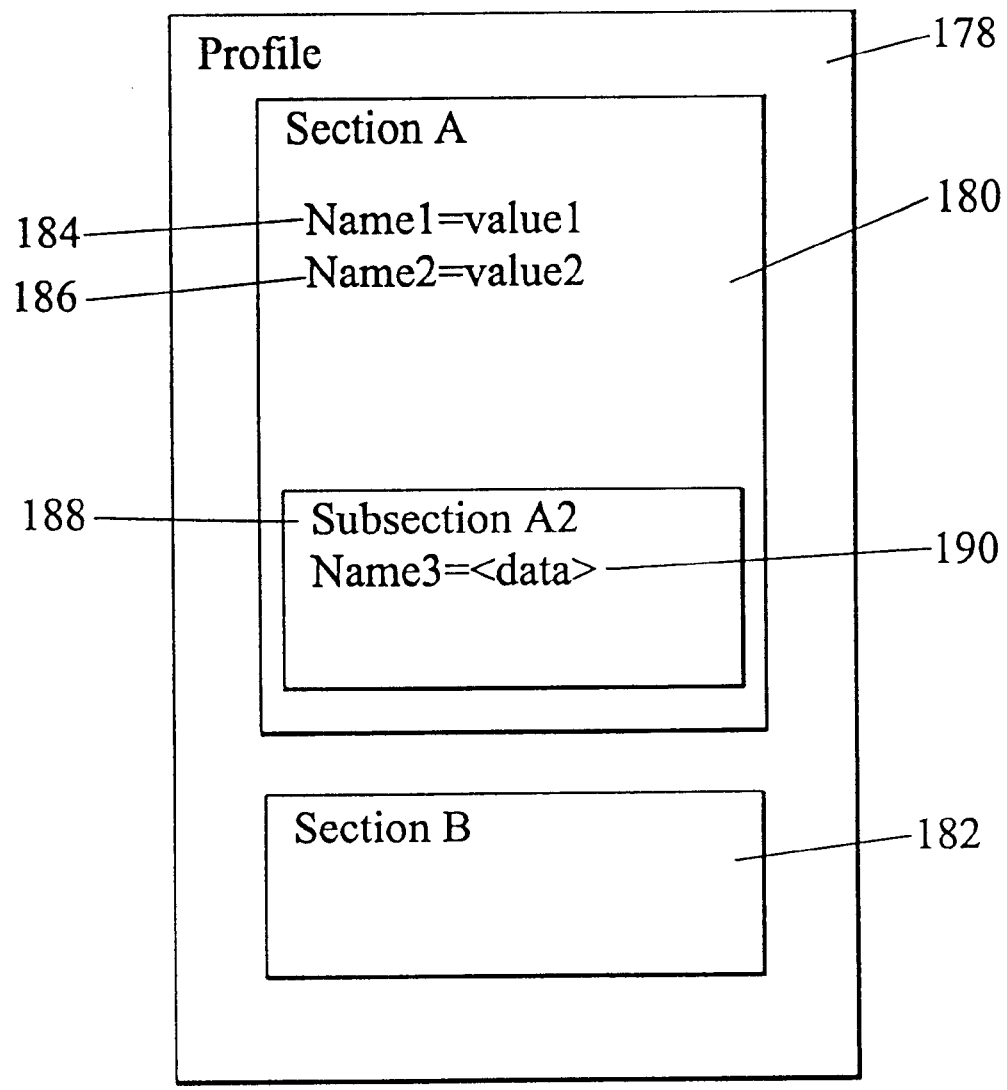
FIG. 12 illustrates the logical organization of a user profile.

FIG. 12 shows a logical organization of an illustrative user profile 178. In the illustrative embodiment consistent with the present invention, the user profile may conform with the Open Profiling Standard (OPS). In accordance with that standard, the information contained in the user profile is divided into sections and subsections. In the exemplary case shown in FIG. 12, the profile 178 is divided into a first section 180 and a second section 182. Suppose that the first section 180 contains address information and section 182 contains credit card information. The first section 180 also contains a subsection 188. This subsection 188 may contain, for example, a phone number. Each statement is a name/value pair. The first section includes statements 184 and 186 that assign given values to properties. The subsection 188 also contains a statement 190 that assigns a data value to a property. Permissions are granted on a section or subsection basis.

The information contained in the user profile 48 may vary. The user profile may contain information such as name, address, and credit card information. In general, the information is personal to the user.

Figure 13:
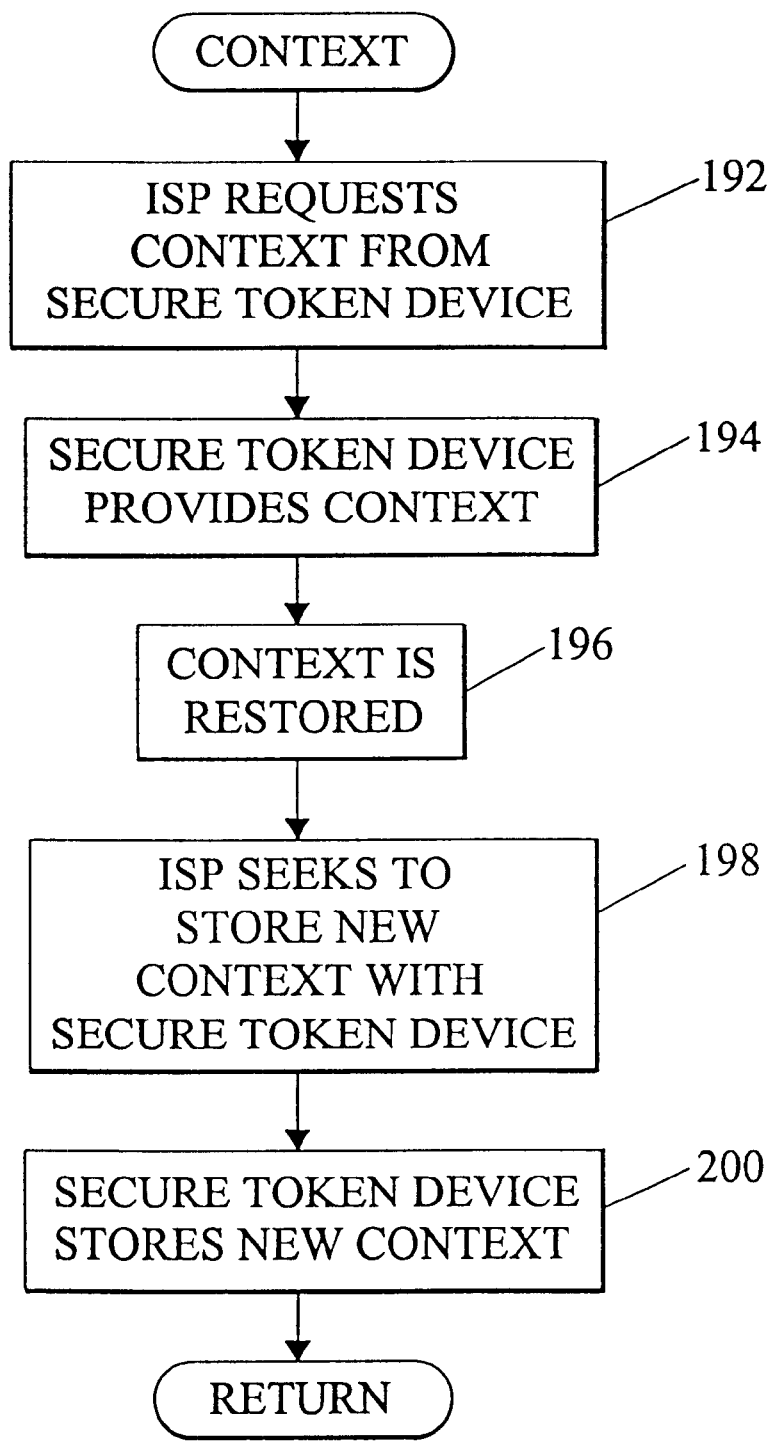
FIG. 13 is a flow chart illustrating the steps that are performed to restore a context in the illustrative embodiment of the present invention.

As was discussed above, the secure token device 10 may be used as a vehicle for preserving contextual information. In particular, the context of a given session with an ISP may be preserved for later restoration in a subsequent session. The context may hold a wide variety of different information. For instance, user preferences regarding settings and various web sites may be restored in the context. Where the ISP begins a session with the user, the ISP requests contextual information from the secure token device 10 (step 192 in FIG. 13). The secure token device then provides the context to computer system 14, which forwards the information to the ISP at the remote server 16 (step 194 in FIG. 13). The contextual information is used to restore the previous context (step 196 in FIG. 13). Subsequently, the ISP seeks to store the new context of the current session with the secure token device 10 so that the new context may be subsequently restored in the next session (step 198 in FIG. 13). The new context is sent to the secure token device 10 and the secure token device stores the new context for subsequent use (step 200 in FIG. 13).

The secure token device 10 may provide the ability for the user to pay for services rendered by the ISP during a session with the ISP. As was discussed above, this also assists the ISP in tailoring services to a particular user and in charging the user based upon resource utilization. Initially, the user seeks an ISP service, such as web browsing or electronic mail (step 202 in FIG. 14). The ISP then levies a charge for user to access the servers (step 204 in FIG. 14). The secure token device returns an electronic token representing amount of currency to the ISP (step 206 in FIG. 14). As was mentioned above, the secure token device 10 includes a banking applet 46 that supports the ability to respond to requests and to deliver tokens. The banking applet 46 may support transactions involving MONDEX tokens or other types of electronic currency tokens. MONDEX is an electronic transaction system that employs smart cards for person-to-person payments. MONDEX was developed by National Westminster Bank in conjunction with Midland Bank and British Telecom and has been in use since July 1995. MONDEX uses tokens of a specified format.

Figure 14:
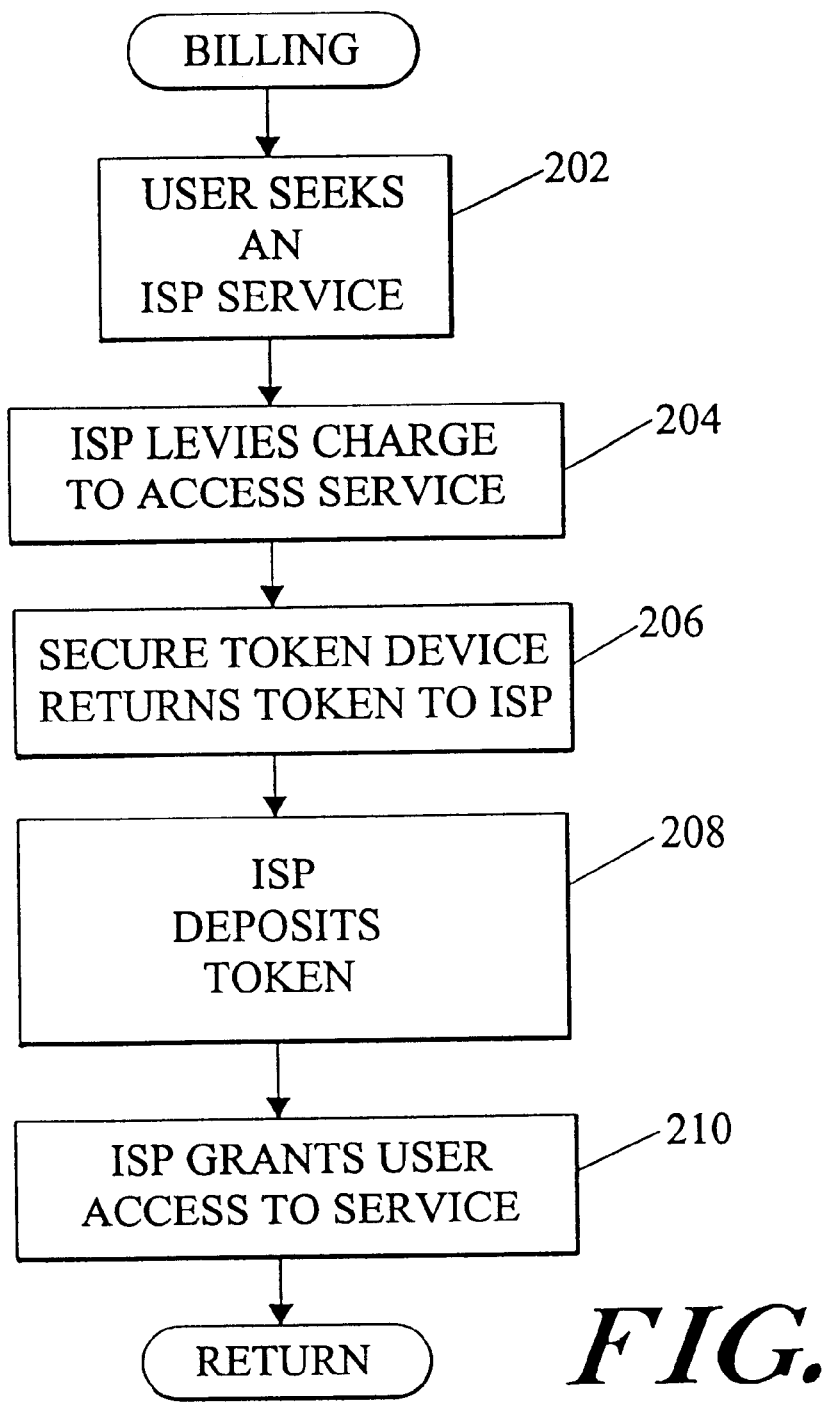
FIG. 14 is a flow chart illustrating the steps that are performed in billing a customer for services rendered by an ISP.

The ISP receives the tokens and deposits the tokens in an appropriate account (step 208 in FIG. 14). After receiving payment, the ISP then grants the user access to the server (step 210 in FIG. 14). The Java electronic commerce framework (defined by Sun Microsystems, Inc.) is an open platform for development of electronic commerce applicators in Java. This framework may be used by the banking applet 46.

Those skilled in the art will appreciate that a number of different electronic transaction systems may be utilized in the present invention. The present invention is not limited to using MONDEX currency. Moreover, the billing scheme may differ from that shown in FIG. 14. The timing at which a party is charged for services may differ such that a party is charged after having finished using a service rather than before accessing the service. Furthermore, there may be instances where an ISP is required to provide change in the form of tokens that are returned to the secure token device 10.

While the present invention has been described with reference to an illustrative embodiment thereof, those skilled in the art will appreciate the various changes in form and detail may be made without departing from the intended scope of the present invention as defined in the appended claims. For example, different varieties of secure token devices may be used to practice the present invention.

What is claimed is:

1. In a computer system where a user accesses services provided by a service provider during sessions via a connectionless protocol, a method comprising the steps of:

providing a secure token device for a user, said secure token device holding contextual information that captures a context of a last session the user had with the service provider;

on behalf of the service provider, receiving the contextual information from the secure token device; and using the contextual information to restore the context of the last session the user had with the service provider during a current session where services are provided by the service provider to the user.

2. The method of claim 1 wherein the connectionless protocol is the Internet Protocol (IP).

3. The method of claim 1 wherein the service provider is an Internet Service Provider (ISP) that provides the user with access to the Internet.

4. The method of claim 1 wherein the contextual information identifies a uniform resource location.

5. The method of claim 1 wherein the secure token device is a smart card.

6. The method of claim 1 wherein the secure token device is an ibutton.

7. The computer system of claim 1 wherein the connectionless protocol is the Internet Protocol (IP).

8. In a secure token device, for use by a user in accessing services of a service provider via a connectionless protocol during sessions, a method comprising the steps of:

provided contextual information that captures a context of a last session that the user had with the service provider on the secure token device;

receiving a request to read the contextual information on behalf of the service provider; and in response to the requests, outputting the contextual information for use by the service provider in restoring the context of the last session in a current session where services are provided by the service provider to the user.

9. The method of claim 8 wherein the connectionless protocol is the Internet Protocol (IP).

10. The method of claim 8 wherein the service provider is an Internet Service Provider (ISP) that provides the user with access to the Internet.

11. The method of claim 9 wherein the service provider is an Internet Service Provider (ISP).

12. The method of claim 8 wherein the contextual information identifies a web site.

13. The method of claim 8 wherein the secure token device is a smart card.

14. The method of claim 8 wherein the secure token device is an ibutton.

15. In a secure token device that interfaces with a computer system, wherein a user accesses services provided by a service provider on the computer system, a method comprising the steps of:

providing personal information about the user in the storage of the secure token device;

establishing what portion of the personal information is permitted to be given to the service provider upon request;

receiving a request from the service provider at the secure token device to obtain at least some of the personal information about the user; and in response to the request, sending to the service provider only information from the portion of the personal information that is permitted to be sent to the service provider.

16. The method of claim 15 wherein the information that is sent to the provider includes less than all of the information requested.

17. The method of claim 15 wherein the user establishes the portion of the personal information that is permitted to be given to the service provider upon request.

18. The method of claim 15 wherein when the service provider requests only information that is not permitted to be given to the service provider, the request is rejected by the secure token device.

19. The method of claim 15 wherein the secure token device is a smart card.

20. The method of claim 15 wherein the secure token device is an ibutton.

21. In a secure token device that interfaces with a computer system, wherein a user of the secure token device receives services from an Internet service provider (ISP) on the computer system, a method comprising the steps of:

providing tokens representing currency on the secure token device;

receiving a request for payment for services from the ISP; and forwarding at least one token from the secure token device to the ISP in response to the request.

22. In a network having a computer system where a user accesses services provided by a service provider during sessions via a connectionless protocol and a secure token device for enabling the user to access the services provided by the service provider, wherein the secure token device holds contextual information that captures a context of a last session the user had with the service provider, a computer-readable medium holding computer-executable instructions for performing a method, comprising the steps of:

receiving the contextual information from the secure token device on behalf of the service provider;

using the contextual information to restore the context of the last session the user had with the service provider during a current session where services are provided by the service provider to the user.

23. The computer-readable medium of claim 22 wherein connectionless protocol is the Internet Protocol (IP).

24. The computer-readable medium of claim 22 wherein the service provider is an Internet Service Provider (ISP) that provides the user with access to the Internet.

25. The computer-readable medium of claim 22 wherein the contextual information identifies a web site.

26. In a system where a secure token device that interfaces with a computer system, wherein a user accesses services provided by a service provider on the computer system and personal information about the user is provided in the storage of the secure token device, a computer-readable medium holding computer-executable instructions for performing a method comprising the steps of:

establishing what portion of the personal information is permitted to be given to the service provider upon request;

receiving a request from the service provider at the secure token device to obtain at least some of the personal information about the user; and in response to the request, sending to the service provider only information from the portion of the personal information that is permitted to be sent to the service provider.

27. The computer-readable medium of claim 26 wherein the information that is sent to the provider includes less than all of the information requested.

28. The computer-readable medium of claim 26 wherein when the service provider requests only information that is not permitted to be given to the service provider, the request is rejected by the secure token device.

29. The computer-readable medium of claim 26 wherein when the service provider requests only information that is not permitted to be given to the service provider, the request is rejected by the secure token device.

30. The computer-readable medium of claim 26 wherein the service provider is an Internet Service Provider (ISP).

31. The computer-readable medium of claim 26 wherein the secure token device is a smart card.

32. The computer-readable medium of claim 26 wherein the secure token device is an ibutton.

33. A computer system wherein a user accesses services provided by a service provider during a during sessions via a connectionless protocol and a secure token device is provided for the user, said secure token device holding contextual information that captures a context of a last session that user had with the service provider, said computer system comprising:

interface means for interfacing with the secure token device to facilitate communications between the computer system and the secure token device;

means for receiving the contextual information from the secure token device; and means for using the contextual information to restore the context of the last session the user had with the service provider during a current session where services are provided by the service provider to the user.

34. The computer system of claim 33 wherein the secure token device is a smart card.

* * * * *